United States Patent [19]

McEwan

[11] Patent Number: 5,767,953
[45] Date of Patent: Jun. 16, 1998

[54] LIGHT BEAM RANGE FINDER

[75] Inventor: Thomas E. McEwan, Livermore, Calif.

[73] Assignee: The Regents of the University of California, Oakland, Calif.

[21] Appl. No.: 486,081

[22] Filed: Jun. 6, 1995

Related U.S. Application Data

[63] Continuation-in-part of Ser. No. 359,151, Dec. 19, 1994, abandoned, which is a continuation-in-part of Ser. No. 300,909, Sep. 6, 1994, Pat. No. 5,510,800, which is a continuation-in-part of Ser. No. 58,398, May 7, 1993, Pat. No. 5,457,394, which is a continuation-in-part of Ser. No. 44,745, Apr. 12, 1993, Pat. No. 5,345,471.

[51] Int. Cl.$^6$ .................................................. G01C 3/08
[52] U.S. Cl. ...................... 356/5.01; 356/5.02; 356/5.03; 356/5.08
[58] Field of Search .................... 356/5.01–5.08; 342/94, 134–136

[56] References Cited

U.S. PATENT DOCUMENTS

| | | |
|---|---|---|
| 3,604,803 | 9/1971 | Kahn . |
| 3,897,150 | 7/1975 | Bridges et al. . |
| 3,902,803 | 9/1975 | Lego, Jr. . |
| 3,947,119 | 3/1976 | Bamberg et al. . |
| 4,125,835 | 11/1978 | Barry . |
| 5,519,209 | 5/1996 | Rapoport et al. .......... 356/5.01 |

*Primary Examiner*—Stephen C. Buczinski
*Attorney, Agent, or Firm*—Henry P. Sartorio

[57] ABSTRACT

A "laser tape measure" for measuring distance which includes a transmitter such as a laser diode which transmits a sequence of electromagnetic pulses in response to a transmit timing signal. A receiver samples reflections from objects within the field of the sequence of visible electromagnetic pulses with controlled timing, in response to a receive timing signal. The receiver generates a sample signal in response to the samples which indicates distance to the object causing the reflections. The timing circuit supplies the transmit timing signal to the transmitter and supplies the receive timing signal to the receiver. The receive timing signal causes the receiver to sample the reflection such that the time between transmission of pulses in the sequence in sampling by the receiver sweeps over a range of delays. The transmit timing signal causes the transmitter to transmit the sequence of electromagnetic pulses at a pulse repetition rate, and the received timing signal sweeps over the range of delays in a sweep cycle such that reflections are sampled at the pulse repetition rate and with different delays in the range of delays, such that the sample signal represents received reflections in equivalent time. The receiver according to one aspect of the invention includes an avalanche photodiode and a sampling gate coupled to the photodiode which is responsive to the received timing signal. The transmitter includes a laser diode which supplies a sequence of visible electromagnetic pulses. A bright spot projected on to the target clearly indicates the point that is being measured, and the user can read the range to that point with precision of better than 0.1%.

37 Claims, 5 Drawing Sheets

LIGHT BEAM RANGE FINDER

CONTINUING APPLICATION DATA

The present application is a continuation-in-part of my prior filed United States patent application entitled SHORT RANGE, ULTRA-WIDE BAND RADAR WITH HIGH RESOLUTION SWEPT RANGE GATE; abandoned application Ser. No. 08/359,151; filed Dec. 19, 1994; invented by Thomas McEwan (IL-9567) which is incorporated by reference as if fully set forth herein; which is a continuation-in-part of application Ser. No. 08/300,909, filed Sep. 06, 1994, now U.S. Pat. No. 5,510,800, issued Apr. 23, 1996; which is a continuation-in-part of application Ser. No. 08/058,398, filed May 07, 1993 now U.S. Pat. No. 5,457, 394, issued Oct. 10, 1995; which is a continuation-in-part of application Ser. No. 08/044,745; filed Apr. 12, 1993, now U.S. Pat. No. 5,345,471, issued Sep. 06, 1994. +gi The United States government has rights in this invention pursuant to Contract Number W-7405-ENG-48 between the United States Department of Energy and the University of California for the operation of Lawrence Livermore National Laboratory.

BACKGROUND OF THE INVENTION

1. Field of the Invention

The present invention relates to use of light beams, such as laser beams, in range finding technology; and particularly to the use of a laser beam for measuring the distance to a target with very fine resolution.

2. Description of Related Art

Laser range finding dates back to the 1960's, and was fairly well developed in the 1970's. For example, the Apollo astronauts left laser retro-reflectors on the moon that allowed range measurements from telescope observatories on earth with an accuracy of about six inches using timing equipment designed by the inventor of the present application. Also during the 1970's, laser target designators were being developed with similar accuracy for use on the battlefield. These laser systems were based on flash lamp pumped Q-switched lasers operating in the near infrared having 100 kilowatt or greater output levels and about 10 nanosecond pulse widths. These lasers were neither eye safe, low cost, nor compact.

During the 1970's, laser diodes had evolved with sufficient power to range over short distances (less than 100 feet) in the infrared band, and progress was made in reducing drive requirements from about 10 amps to less than 0.1 amps. In the 1980's, low drive current visible red laser diodes began to appear in bar code readers and laser pointers. Prices had plummeted by a factor of ten from several hundred dollars and continued downwards as volume usage increased. Commercial laser range finders now include units with about a one centimeter resolution and are housed in a gun shaped enclosure similar to police radar speed guns. One such device costs in the range of $5,000. More recently, Leica, Inc. of Norcross, Ga., has announced a laser range finder known as "Disto". These range finders most likely use continuous wave (CW) modulation, with phase comparison techniques to obtain precision range information. The problems with CW operation include high average power consumption which leads to short laser life and short battery life. The Disto device provided by Leica, Inc. has a published limit of only 400 readings between battery charging. Further problems with continuous wave operation include high laser output levels which could exceed eye safe conditions. Thus, these devices may be suitable for professional use but not for wide spread public use.

Also, more fundamentally, laser speckle creates a noise effect that cannot be averaged out and limits the resolution of prior art laser range finding systems. Laser speckle occurs due to the purity of the laser light itself and accounts for the dazzle that one sees in a laser beam.

Accordingly, it is desirable to provide a visible beam range finder which is accurate, has low power requirements, and is low cost.

SUMMARY OF THE INVENTION

The present invention provides a high resolution laser tape measure device, which can replace both cloth and metal tape measures with a visible beam that measures the distance to a target with a resolution of less than one millimeter. A bright spot projected on to the target clearly indicates the point that is being measured, and the user can read the range to that point with precision of better than 0.1% of range.

Accordingly, the present invention can be characterized as an apparatus for measuring distance which includes a transmitter which transmits a sequence of visible electromagnetic pulses in response to a transmit timing signal. A receiver samples reflections from objects within the field of the sequence of electromagnetic pulses with controlled timing, in response to a receive timing signal. The receiver generates a sample signal in response to the samples which indicates distance to the object causing the reflections. The timing circuit supplies the transmit timing signal to the transmitter and supplies the receive timing signal to the receiver. The receive timing signal causes the receiver to sample the reflections such that the time between transmission of pulses in the sequence and sampling by the receiver sweeps over a range of delays. The transmit timing signal causes the transmitter to transmit the sequence of visible electromagnetic pulses at a pulse repetition rate, and the receive timing signal sweeps over the range of delays in a sweep cycle such that reflections are sampled at the pulse repetition rate and with different delays in the range of delays, such that the sample signal represents received reflections in equivalent time.

The receiver according to one aspect of the invention includes an avalanche photodiode and a sampling gate coupled to the photodiode which is responsive to the receive timing signal. The transmitter includes a laser diode or light emitting diode, which supplies a sequence of visible electromagnetic pulses.

According to one example, the pulse repetition frequency is about 1 MHz, and a sweep cycle for the range of delays is repeated at a sweep rate of less than 16 KHz, for example about 40 Hz. The range of delays over which the sweep cycle is swept may be less than 100 nanoseconds.

According to one aspect of the invention, a laser diode is used to generate the beam of electromagnetic pulses. A laser diode takes about 1 nanosecond after turn-on to achieve high purity output, so pulse modulation according to the present invention creates a highly multimode light output that has a broader light spectrum for the leading nanosecond of the pulse, and much less speckle than other prior art laser systems during that initial interval. By sampling only the leading edge information of short pulses, the speckle effect of the CW method is avoided. An increased pulse width of up to about 5 nanoseconds, or more, for the laser diode output is used in the preferred system. This increases the visibility of the spot, but does not contribute to or alter the measurement accuracy, because measurements are taken at the leading edge of the reflected pulses.

According to yet another aspect of the invention, optics are included with the device to cause the transmitted and received beams to be substantially parallel to prevent parallax problems.

According to yet another aspect of the present invention, the timing circuit includes a first highly stable clock, such as a quartz clock or atomic clock, for producing the transmit timing signal at a frequency f1. The timing circuit also includes a second highly stable clock, such as a quartz clock or atomic clock, oscillating at the frequency f2 which is equal to the frequency f1 less the scan rate fscan. Each scan cycle is initiated at the coincidence of a rising edge of the outputs of the clocks at f1 and f2. These clocks will coincide at the scan rate. The clock output f2 will cause the sample gate to sample the received echoes over a range of delays at the scan rate. Furthermore, the use of the highly stable quartz or atomic clock provides an extremely accurate output for the system. Alternative systems may use analog, or digital to analog conversion, based delay generators, which provide substantial accuracy and very high resolution.

The present invention can also be characterized as a method for measuring the distance from a first location to a second location which comprises 1) transmitting from the first location to the second location a visible beam of pulses with controlled timing; 2) sampling at the first location reflections of the visible beam which are, preferably, substantially parallel to the transmitted beam, such that the time delay between transmission of pulses in the beam during the transmitting step, and sampling of the reflection sweeps over a range of delays; 3) processing the resulting samples to determine the round trip time of flight of pulses in the beam. Further, the transmitting step according to the present invention includes generating pulses so that at least the leading edges of the pulses are highly multimode, such as during the first nanosecond of the generation of a pulse by a laser diode.

The present invention solves the problems with many prior art laser range finders, including:

1) sub-nanosecond pulse leading edge sampling eliminates laser diode speckle noise which limits accuracy in the prior art;
2) sub-nanosecond pulse sampling directly provides high resolution while eliminating phase ambiguities found in CW systems;
3) low duty cycle reduces average laser output power, making, the device eye safe while extending both laser diode life and battery life; and
4) micropower radar range finding circuits utilized are extremely low cost.

Other aspects and advantages of the present invention can be seen upon review of the figures, the detailed description and the claims which follow.

DETAILED DESCRIPTION OF PREFERRED EMBODIMENTS

Figure 1:
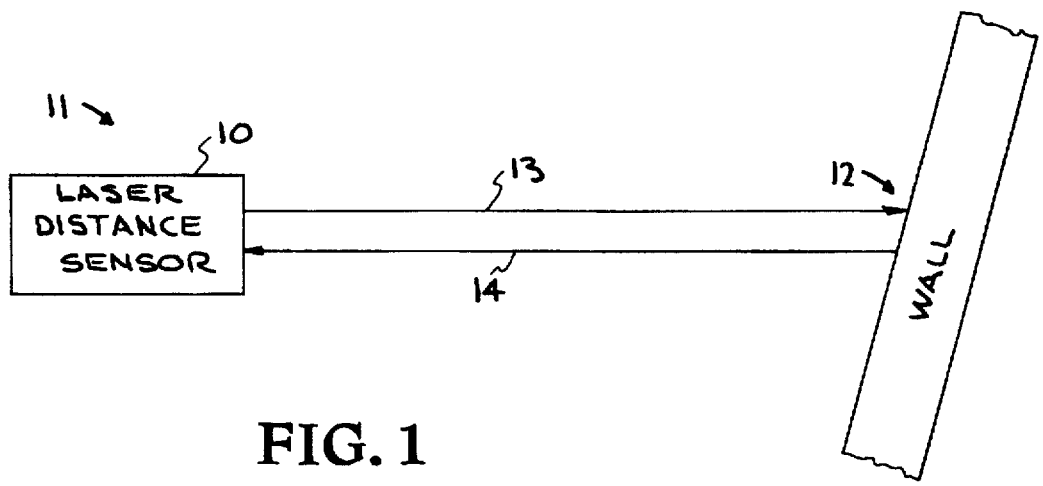
FIG. 1 is a diagram illustrating a laser distance sensor according to the present invention.

A detailed description of preferred embodiments of the present invention is provided with reference to FIGS. 1–7, in which FIG. 1 illustrates a context for use of the laser range finder according to the present invention. As can be seen in FIG. 1, a laser distance sensor 10 is positioned at a first location, generally 11, and illuminates a spot, generally 12, at a second location. A beam of electromagnetic pulses, generally 13, illuminates the spot 12, which reflects the pulses along the path 14 substantially parallel to the beam 13. The laser distance sensor according to the present invention measures the round trip time of flight of the stream of pulses.

Note that FIG. 1 illustrates that the location of the spot 12 need not be in a place which is perpendicular to the beam 13, so long as sufficient light is scattered back along the path 14 that it can be detected by the sensor 10.

Figure 2:
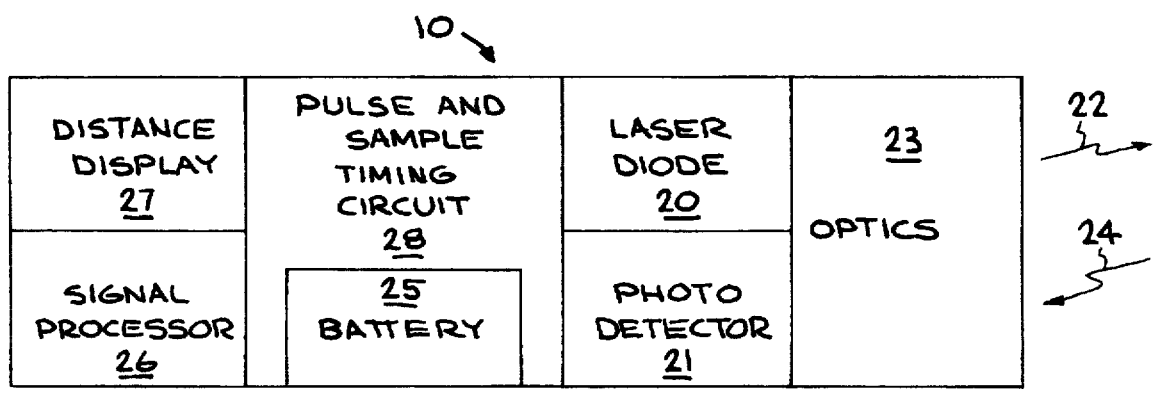
FIG. 2 is a simplified block diagram of a laser distance sensor according to the present invention.

FIG. 2 illustrates the basic components of the laser distance sensor 10. According to the present invention, in a preferred embodiment the laser distance sensor 10 includes a laser diode 20 and a photodetector 21. The laser diode 20 emits a stream of electromagnetic pulses in a visible range along path 22 guided by optics, generally 23. The reflected pulses from the beam on path 22 are received along the path 24, through the optics into a photodetector 21. Pulse and sample timing circuitry, generally 28, which includes a battery 25 for powering the device, is coupled to the laser diode 20 and the photodetector 21. The pulse and sample timing circuitry 28 supplies a sample signal to a signal processor 26, which controls a distance display 27.

Figure 3:
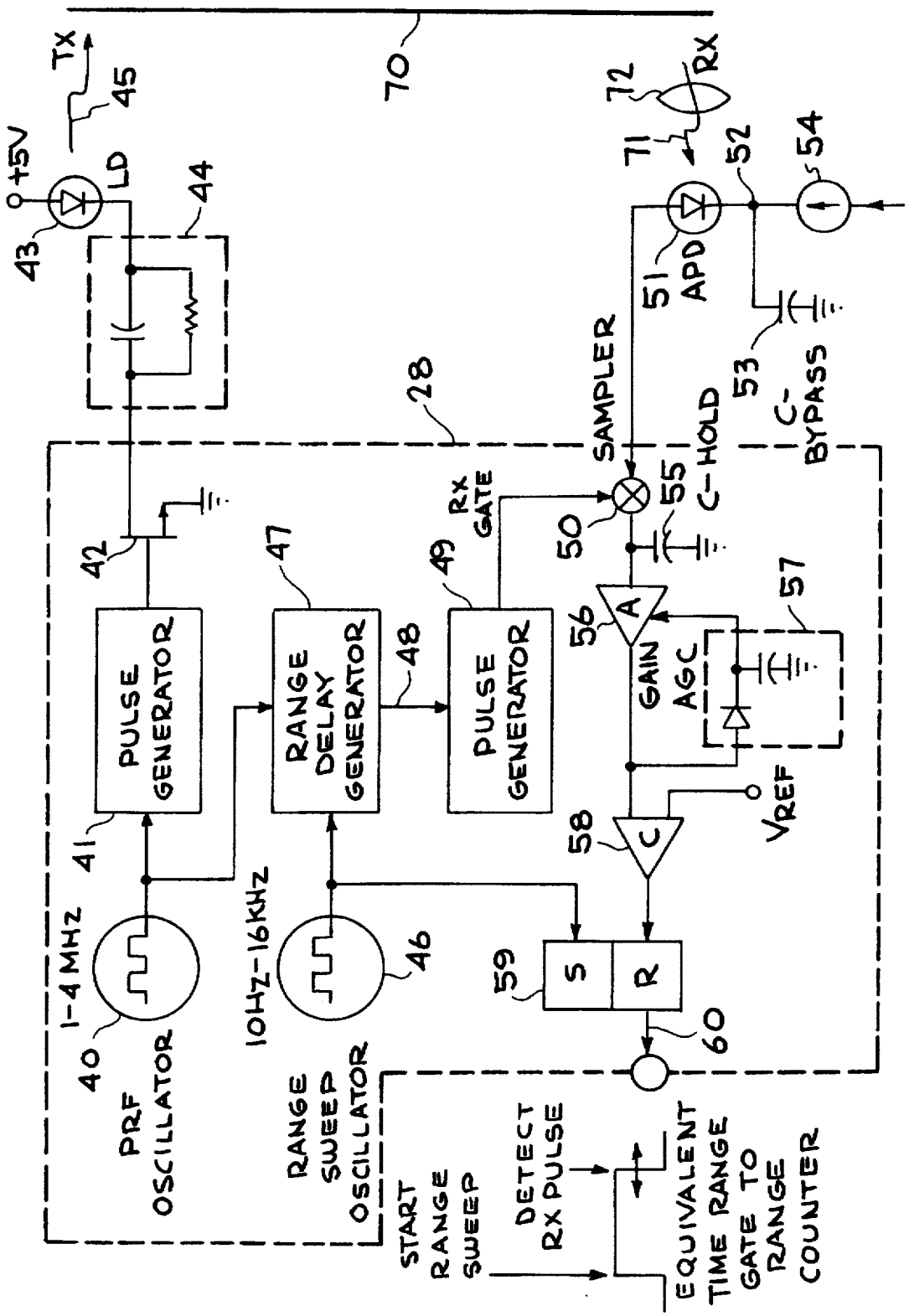
FIG. 3 is a functional block diagram of the laser distance sensor according to the present invention.

FIG. 3 illustrates a simplified block diagram of the pulse and sample timing circuitry 28, the laser diode 20, and the photodetector 21 for use with the system of FIG. 2. As can be seen, the system includes a pulse repetition oscillator, generally 40, which oscillates, for example, at a rate of 1 to 4 MHz. This oscillator drives a pulse generator 41, which drives a high speed transistor 42. The transistor drives a laser diode 43 through the parallel resistor capacitor network, generally 44. The laser diode 43 is coupled to the 5 volt supply.

In response to the pulse generating circuitry 41 and the fast transistor 42, a sequence of visible pulses of electromagnetic radiation are generated along path generally 45. The laser diode 20 is driven directly by a switched bipolar transistor with a greater than 5 nanosecond pulse width. This results in a duty cycle of slightly greater than 1%. Increasing the pulse width makes the light spot more visible, but does not contribute to or alter the measurement accuracy. A lower duty cycle saves battery power. Other light sources, such as a light emitting diode, can be utilized besides the laser diode, so long as a detectable stream of pulses of light can be generated and focused on the target location. The target 70 reflects the transmitted pulses along path 71 to a lens 72 in the receiver where path 71 is substantially parallel to the path 45.

The system also includes a range sweep oscillator 46, which oscillates, for example, in the range from 10 Hz to about 16 KHz. The range sweep oscillator 46 controls a range delay generator 47. The range delay generator 47 receives the output of the pulse repetition frequency oscillator 40, and generates a receive timing signal on line 48 for supply to a pulse generator 49. Pulse generator 49 generates a gate signal for a sample gate 50.

The sample gate 50 is coupled to an avalanche photodiode 51 mounted at the focal point of lens 72. The avalanche photodiode 51 has its anode coupled to the sample gate 50, and its cathode connected to node 52. Node 52 has a bypass capacitor 53 coupled to ground, and a constant current source or high value resistor 54 connected between it and a high voltage. This causes a constant current biasing for the avalanche photodiode 51.

An avalanche photodiode is used in the system described, since the received light pulse is weak. Alternative systems may use, for example, PIN photodiodes. Avalanche photodiodes provide at least 10 dB greater sensitivity than a standard photodiode/amplifier combination. In this application, the avalanche photodiode provides about 1000 times current gain with a bandwidth of greater than 1 GHz, replacing an expensive high current drain amplifier, and has a much better noise performance and electromagnetic interference (EMI) immunity. A further feature of the avalanche photodiode is that it can be operated in an optical self-bias mode. Biasing the avalanche photodiode with a constant current causes the avalanche photodiode to self-regulate its gain for optical input levels that allow all bias current to be signal current. No matter how strong or weak the signal is, the avalanche photodiode is forced to change its gain (i.e. change its breakdown voltage) to maintain a constant current. This automatic gain control mechanism can hold signal amplitudes constant to 0.1% over a 100 times change in optical signal level, and it provides constant signal output amplitude over a large temperature range (−55° C. to +85° C.). At very weak optical input levels, the avalanche photodiode bias current equals the avalanche multiplied dark current, and the signal current may only be a small fraction of the total current. Thus, automatic gain control action is compromised. To overcome this limitation, the receiver incorporates an automatic gain control circuit 57 to maintain a precision receive pulse detection threshold.

The output of the sample gate 50 is connected to a charge holding capacitor 55. The charge holding capacitor 55 is connected to the input of an amplifier 56. An automatic gain control circuit 57 is connected between the output of the amplifier 56 and its gain control input.

Also, the output of the amplifier 56 is supplied to a comparator 58 which compares the output of the amplifier 56 with a reference voltage $V_{REF}$. The output of the comparator 58 is supplied to the reset input of a set/reset flip-flop 59. The set input for the flip-flop 59 is supplied by the range sweep oscillator 46. Thus, a signal is generated on line 60 which rises at the beginning of each range sweep as indicated by the rising edge of the range sweep oscillator. This signal falls at the point in equivalent time at which the sampler detects a reflected pulse. Thus, an equivalent time range gate signal is generated which can be supplied to further signal processing resources for the purposes of generating a range display, or for other reasons.

In one preferred example, the pulse repetition frequency is about 4 MHz, and the range sweep oscillator 46 operates at about 40 Hz. This results in an equivalent time signal on the output of the amplifier 56, which expands a 1 nanosecond pulse to a 1 millisecond fluctuation.

Figure 4:
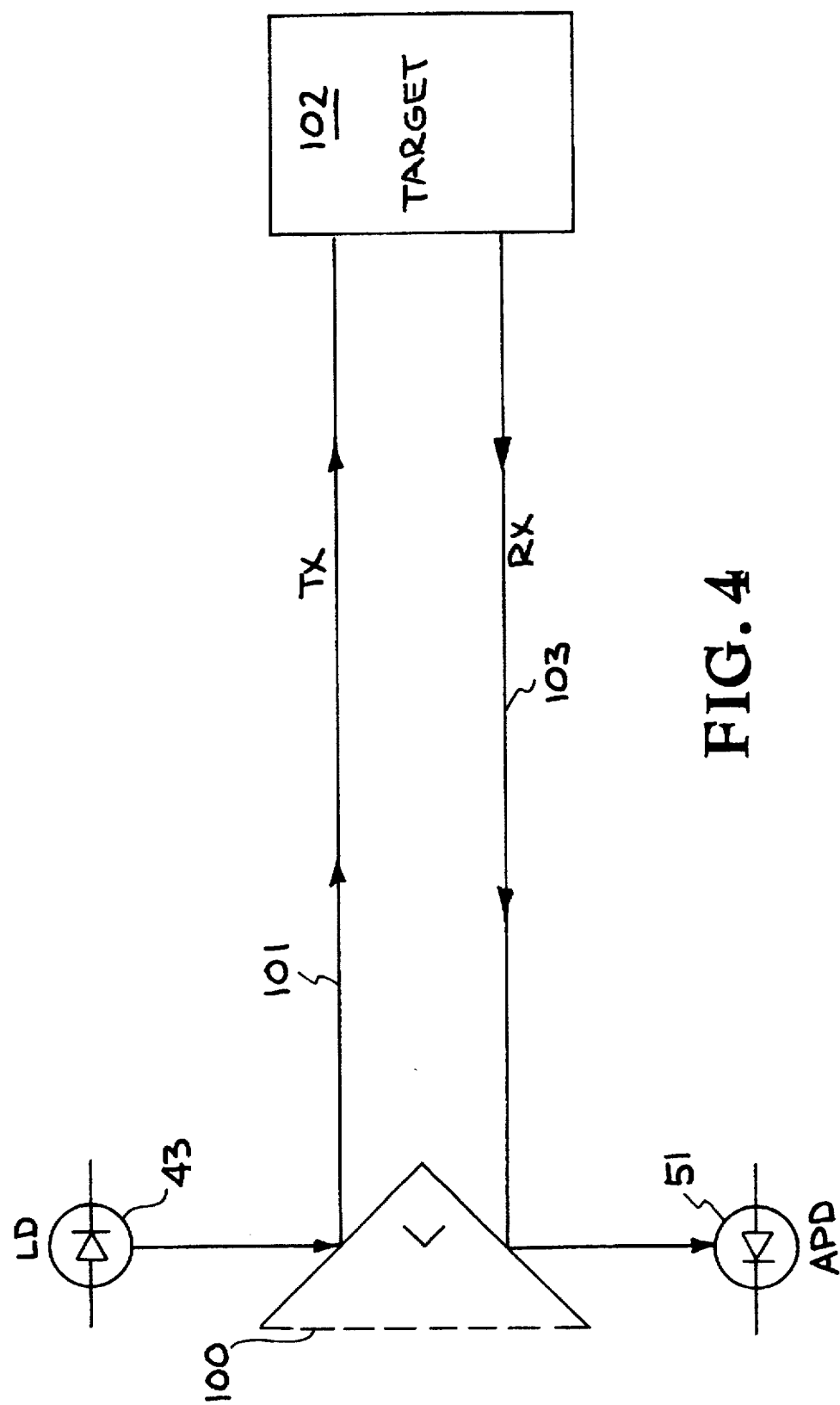
FIG. 4 is a schematic diagram of a parallel beam optical arrangement for use with the laser distance sensor of the present invention.

FIG. 4 schematically illustrates optics utilized for insuring parallel beam alignment. Thus, the laser diode 43 of FIG. 3 is mounted such that its beam strikes one side of a pair of 90° mirrors or a silvered prism, generally 100. The beam is reflected along path 101 to the target 102. Elements of the beam which were reflected along the path 101 from the target 102 strike the opposite side of the 90° mirrors or silver prism. This beam is reflected into the avalanche photodiode 51 of the circuit of FIG. 3. Other optics for insuring that the transmitted and received beams are substantially parallel can be utilized as known in the art.

Figure 5:
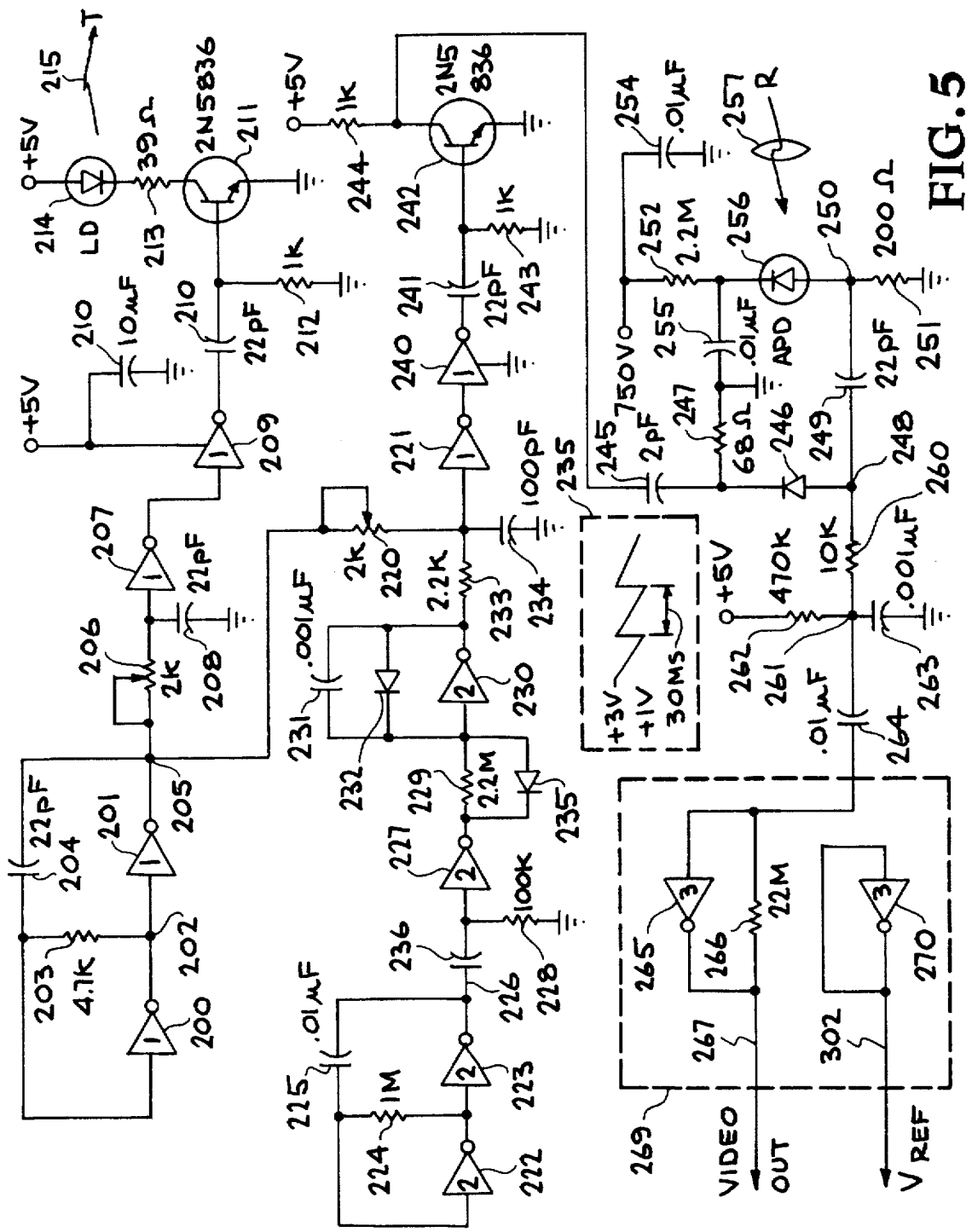
FIG. 5 is an electrical schematic diagram of the transmitter and receiver circuits according to one embodiment of the present invention.

FIG. 5 provides an electrical schematic diagram of a laser tape measure system such as that described with reference to FIG. 3. The system includes a 4 MHz frequency generator based on inverter 200 and inverter 201. The output of inverter 200 is connected to node 202, and across resistor 203 to the input of inverter 200. The input of inverter 201 is connected to node 202. The output of inverter 201 is connected across capacitor 204 to the input of inverter 200. The output of the oscillator is supplied on line 205 across adjustable resistor 206 to the input of inverter 207. A capacitor 208 is connected from the input of inverter 207 to ground. The adjustable resistor 206 and capacitor 208 provide a range zeroing mechanism for the device.

The output of the inverter 207 is supplied to the input of the inverter 209. Inverter 209 has a large capacitor 210 connected between the supply and ground on the inverter. The output of inverter 209 is connected through capacitor 210 to the base of transistor 211. Also, a resistor 212 is connected from the base of the transistor 211 to ground. The emitter of transistor 211 is connected to ground. The collector of transistor 211 is connected through resistor 213 to the laser diode 214. The anode of the laser diode 214 is coupled to the supply voltage. Thus, the laser diode 214 generates a sequence of pulses along the transmit path 215. Using the laser diode of the present invention, a one-quarter inch diameter spot is generated at about 15 feet. Furthermore, the pulses generated using the circuitry last about 5 nanoseconds and are repeated at the 4 MHz pulse repetition frequency.

The output of the pulse repetition frequency oscillator on line 205 is connected through adjustable resistor 220 to the input of inverter 221. The adjustable resistor 220 is used for range sweep calibration. The input of the inverter 221 is also driven by the range delay circuitry, and range sweep oscillator. The range sweep oscillator includes inverters 222 and 223 in series. Resistor 224 is connected from the output of inverter 222 to its input. A capacitor 225 is connected from the output of inverter 223 to the input of inverter 222. The output of inverter 223 is connected across capacitor 236 to the input of inverter 227. The input of inverter 227 is also connected across resistor 228 to ground. The output of inverter 227 is connected across resistor 229 to the input of inverter 230. Inverter 230 operates in the linear mode. Also, diode 235 has its anode connected to the input of inverter 230 and its cathode connected to the output of inverter 227.

The output of inverter 230 is connected across capacitor 231 to its input and to the anode of diode 232. The cathode of diode 232 is connected to the input of the inverter 230. The output of the inverter 230 is also connected across resistor 233 to the input of inverter 221. Further, a capacitor 234 is connected from the input of inverter 221 to ground. This circuitry produces a voltage ramp as shown generally at 235 which has about a 30 millisecond sweep cycle.

The output of the inverter 221 is a swept delay receive timing signal which is supplied to the input of inverter 240. The output of inverter 240 is supplied through capacitor 241 to the base of transistor 242. Also, resistor 243 is connected from the base of transistor 242 to ground. The emitter of transistor 242 is connected to ground. The collector is connected through resistor 244 to the 5 volt supply. The collector of transistor 242 is also connected through capacitor 245 to the cathode of Schottky diode 246. Further, resistor 247 is connected from the cathode of Schottky diode 246 to ground. The anode of Schottky diode 246 is coupled to node 248. Node 248 is coupled through capacitor 249 to node 250. A resistor 251 is connected from node 250 to ground. The anode of an avalanche photodiode 256 is also coupled to node 250. The cathode is connected across resistor 252 to a high voltage supply, such as 750 volts. A capacitor 254 is connected from the supply to ground. Also, capacitor 255 is connected from the cathode of the avalanche photodiode 256 to ground. A one centimeter diameter, 2 centimeter focal length lens 257 is mounted to focus the received beam onto the avalanche photodiode 256 mounted at or near its focal point.

Node 248 is also coupled through resistor 260 and to node 261. Node 261 is connected across resistor 262 to the 5 volt supply. Also, the capacitor 263 is connected from node 261 to ground. Node 261 is coupled through capacitor 264 to the input of inverter 265. A resistor 266 is connected in feedback across the inverter 265, causing it to operate in the linear mode. The output of inverter 265 is a video signal on line 267 which is supplied to signal processing resources.

The inverters 200, 201, 207, 209, 221, and 240 are implemented using 74 HC04 devices. The inverters 222, 223, 227, 230, 265, and 270 are implemented using MC14069. The transistors 211 and 242 are 2N5836 bipolar transistors. The laser diode 214 according to a preferred system comprises Digi-key Part No. P459-ND. The avalanche photodiode 256 according to a preferred system comprises RCA silicon APD type 6489.

A reference voltage $V_{REF}$ is generated using inverter 270 which is identical to inverter 265, which may be on the same chip 269 as indicated by dashed lines in the figure, and which has its input coupled to its output. The signal provided on the output of the inverter 270 is used as an accurate voltage reference for a comparator used to detect a received pulse.

Figure 6:
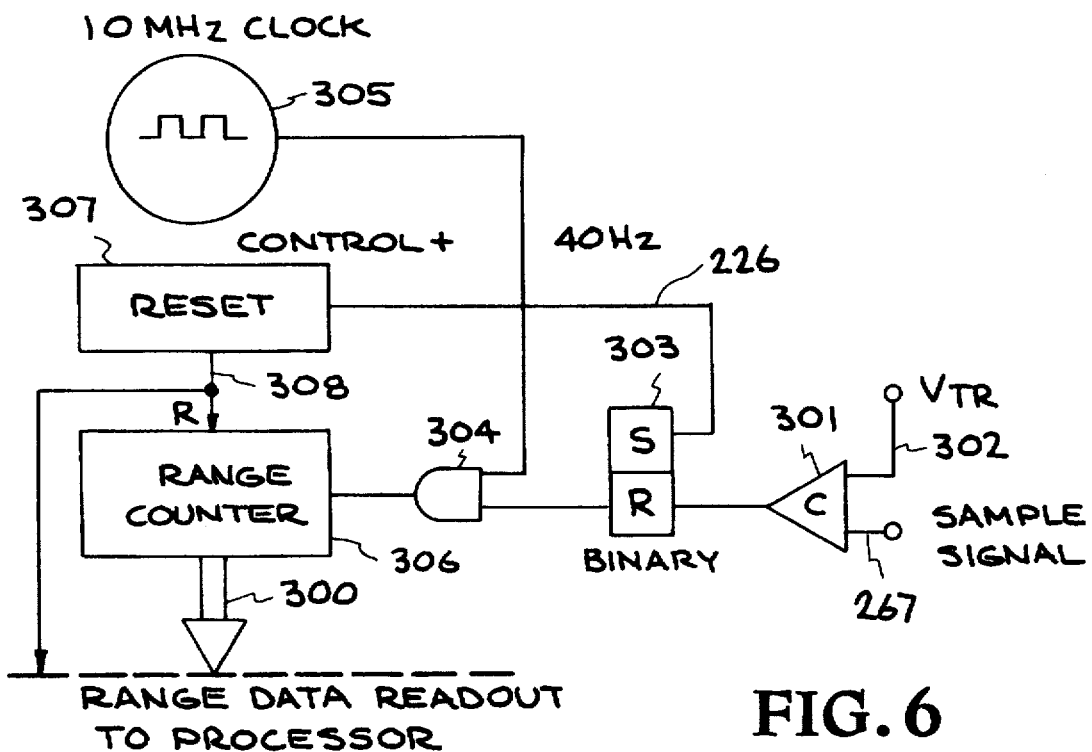
FIG. 6 is a schematic diagram of signal processing circuitry used to generate a range data readout for the laser distance sensor of the present invention.

FIG. 6 shows the signal processing circuitry for generating range data readout 300 for use by a range display on the device of the present invention. Thus, the sample signal on line 267 from the system of FIG. 5 is supplied to comparator 301. The comparator 301 compares the signal on line 267 against a voltage threshold 302. A flip-flop 303 is turned on at the beginning of each range sweep in response to the 40 Hz clock from line 226 of FIG. 5.

The flip-flop 303 is clocked high on the rising edge of the 40 Hz clock from line 226, and is reset when the output of the comparator 301 goes high. The output of the flip-flop 303 is supplied as a first input to AND gate 304. The second input of the AND gate 304 is the output of a 10 MHz clock 305 in this example. The output of the AND gate 304 drives a range counter 306. Thus, the range counter increments as long as the flip-flop 303 is clocked high and stops incrementing as soon as the sample signal crosses the threshold indicated by the voltage on line 302.

Control circuitry, generally 307, is responsive to the 40 Hz clock on line 226 to reset the range counter by a control signal on line 308 at the beginning of each sweep. With a 10 MHz clock on line 305 counting a 40 Hz range sweep, very high resolution is provided in this system. The range sweep circuitry in the system of FIG. 5 is based on analog voltage to time converter circuits that limit the range accuracy to 1%, although resolution as opposed to accuracy is submillimeter.

Figure 7:
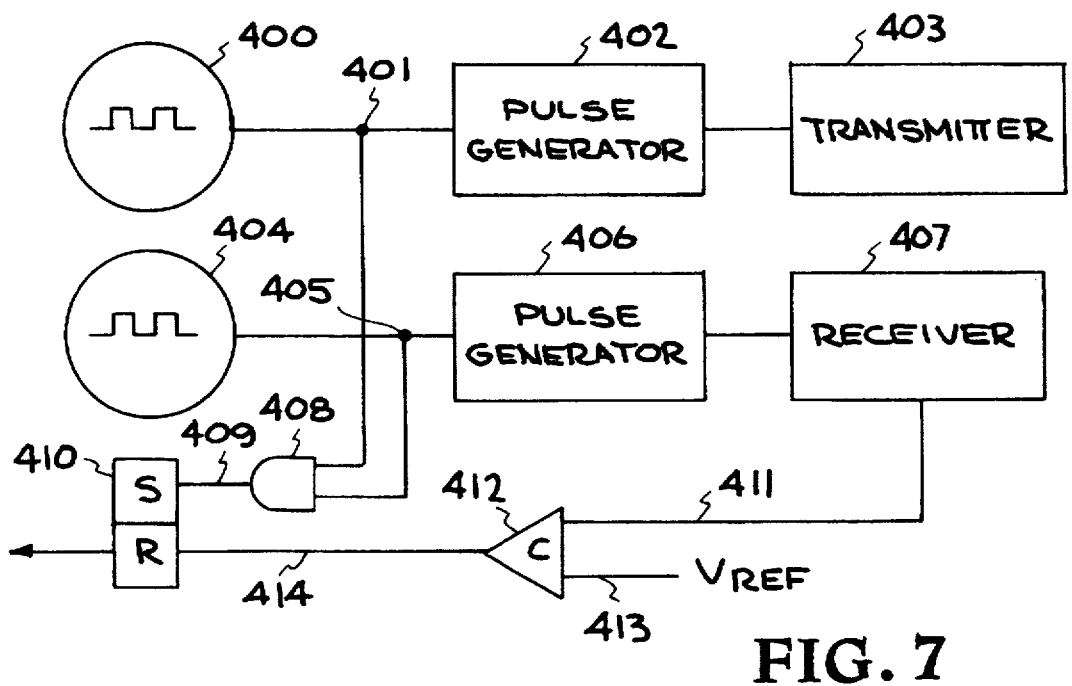
FIG. 7 illustrates an alternative scan technique according to the present invention based on highly stable quartz or atomic clocks.

The absolute accuracy of the system is limited by the drift in the gate delays and in the components used to implement the transmitter and the receiver. One source of such drift is the ramp generator used to generate the scan of delays. An alternative system for causing the swept delay is based on tuned quartz oscillators as shown in FIG. 7. The first quartz oscillator used for the pulse repetition frequency generator is set at the desired frequency, such as 2 MHz to 4 MHz. The second tuned quartz oscillator can be set at the pulse repetition frequency less the sweep frequency of 40 Hz (2 MHz–40 Hz). Because of the stability possible with quartz oscillators (or, alternatively, atomic clocks), the drift in the receive and transmit timing signals can be more precisely controlled.

In FIG. 7, the system includes a first stable oscillator 400 which oscillates at a frequency f1. The oscillator 400 may be implemented using a quartz crystal or atomic clock based on techniques known in the art. This signal provides the transmit timing signal on line 401. The transmit timing signal on line 401 drives a pulse generator 402, such as that described above, which in turn drives the transmitter 403. A second oscillator 404 is included which oscillates at a frequency $f1-f_{scan}$. Thus, the oscillator 404 may be set to oscillate at a frequency which is 40 Hz less than the transmit timing signal on line 401. Again, this oscillator can be implemented using a quartz crystal oscillator, a frequency synthesizer or an atomic clock using techniques known in the art. This oscillator generates a receive timing signal on line 405 which drives a pulse generator 406 and a receiver 407. The signal processing resources used to count the range gate are controlled by the AND gate 408. The AND gate 408 has its inputs connected to the signals on lines 401 and 405. Thus, it generates a pulse on line 409 upon the coincidence of the transmit timing signal and the receive timing signal pulses. This marks the beginning of a range sweep and sets the flip-flop 410. The flip-flop 410 is reset in response to the sample signal on line 411 from the receiver 407. Thus, the sample signal on line 411 is connected to the comparator 412 which compares the signal to a reference voltage 413. The output of the comparator on line 414 resets the flip-flop 410 indicating the range of the object causing the received reflections.

Accordingly, a submillimeter resolution "laser tape measure" has been provided which replaces the cloth and metal tape measure with a visible laser beam that measures distance to the target with a resolution of less than 1 millimeter. The device is eye safe, low power for long laser diode and battery life, and extremely low cost.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for measuring distance, comprising:
    a transmitter which transmits a sequence of visible electromagnetic pulses in response to a transmit timing signal;
    a receiver which samples reflections from objects of the sequence of visible electromagnetic pulses with controlled timing, in response to a receive timing signal, and generates a sample signal in response to the samples, the sample signal indicating distance to an object, wherein the receiver includes an avalanche photodiode or a PIN photodiode, a sampling gate

9 having an output and an input coupled to the avalanche photodiode or PIN photodiode, and an amplifier coupled to the output of the sampling gate;

a timing circuit which supplies the transmit timing signal to the transmitter and supplies the receive timing signal to the receiver, the receive timing signal causing the receiver to sample the reflections such that time between transmission of pulses in the sequence and sampling by the receiver sweeps over a range of delays.

2. The apparatus of claim 1, wherein the transmit timing signal causes the transmitter to transmit the sequence of visible electromagnetic pulses at a constant pulse repetition rate to define a time between pulses, and the time between pulses is greater than a difference in the delays at the beginning and the end of the range of delays.

3. The apparatus of claim 1, wherein the transmit timing signal causes the transmitter to transmit the sequence of visible electromagnetic pulses at a pulse repetition rate, and wherein the receive timing signal sweeps over the range of delays in a sweep cycle such that reflections are sampled at the pulse repetition rate and with different delays in the range of delays.

4. The apparatus of claim 3, wherein the sweep cycle is repeated at a sweep rate of less than 16 kiloHertz.

5. The apparatus of claim 3, wherein the sweep cycle is repeated at a sweep rate of less than 100 Hertz.

6. The apparatus of claim 3, wherein the pulse repetition rate is greater than about 1 megaHertz.

7. The apparatus of claim 1, wherein the transmitter includes a laser diode which supplies the sequence of visible electromagnetic pulses.

8. The apparatus of claim 1 wherein the transmitter produces pulses having at least leading edges which are highly multimode.

9. The apparatus of claim 1 wherein the receiver produces a sample signal representing received reflections in equivalent time.

10. A swept range gate sensor for detecting distance to objects within a field, comprising:

a transmitter, including a light source, which transmits a beam comprising a sequence of pulses from the light source into the field in response to a transmit timing signal;

a receiver, including a light detector, which samples reflections from objects in the field of the beam with controlled timing, in response to a receive timing signal, and generates a sample signal in response to the samples, wherein the light detector comprises an avalanche photodiode or a PIN photodiode;

a timing circuit which supplies the transmit timing signal to the transmitter and supplies the receive timing signal to the receiver, the receive timing signal causing the receiver to sample the reflections such that the time between transmission of pulses in the sequence by the transmitter and sampling by the receiver sweeps over a range of delays; and a signal processor, coupled with the receiver, to indicate a distance to the object in response to the sample signal.

11. The sensor of claim 10, wherein the signal processor comprises a counter which counts at a count rate from a beginning of the sweep until the sample signal reaches a threshold, and generates a counter output indicating a position of a source of a reflection in the field.

12. The sensor of claim 10, wherein the timing circuit includes a voltage controlled delay circuit having a control input, and a voltage ramp generator coupled to the control

10 input of the voltage controlled delay circuit to sweep the receive timing signal.

13. The sensor of claim 12, wherein the voltage ramp generator comprises a digital to analog converter.

14. The sensor of claim 12, wherein the voltage ramp generator comprises an analog exponential ramp generator, and the voltage controlled delay circuit produces a delay which is an exponential function of voltage on the control input.

15. The sensor of claim 10, wherein the transmit timing signal causes the transmitter to transmit the sequence of light pulses at a pulse repetition rate, and wherein the receive timing signal sweeps over the range of delays in a sweep cycle such that reflections are sampled at the pulse repetition rate and with different delays in the range of delays, such that the sample signal represents the received reflections in equivalent time.

16. The sensor of claim 15, wherein the sweep cycle is repeated at a sweep rate of less than about 16 kiloHertz.

17. The sensor of claims 16, wherein the sweep cycle is repeated at a sweep rate of less than 100 Hertz.

18. The sensor of claim 16, wherein the pulse repetition rate is greater than about 1 megaHertz.

19. The sensor of claim 10, wherein the receiver includes a sampling gate coupled to the light detector, and an amplifier having an input coupled to the sampling gate.

20. The sensor of claim 10, wherein the light source comprises a laser.

21. The sensor of claim 10, wherein the light source comprises a laser diode.

22. The sensor of claim 10, wherein the light source comprises a light emitting diode.

23. The sensor of claim 10, comprising optics to provide that the transmitted beam and received reflections comprise substantially parallel beams.

24. The sensor of claim 10, wherein the light detector comprises an avalanche photodiode having a constant current biasing circuit.

25. The sensor of claim 10, wherein the beam comprises visible light.

26. The sensor of claim 10, wherein the signal processor includes circuitry which detects leading edges of the reflections.

27. The sensor of claim 10, wherein the light source comprises a laser diode which produces pulses characterized by an interval at a leading edge of a pulse during which the beam is not highly pure, and wherein the signal processor includes circuitry which detects leading edges of the reflections within said interval.

28. A swept range gate sensor for detecting distance to objects within a field, comprising:

a transmitter, including a laser diode, which transmits a light beam comprising a sequence of pulses in response to a transmit timing signal, the pulses in the beam characterized by an interval at a leading edge during which the beam is not highly pure;

a receiver, including an avalanche photodiode coupled with a sample gate, which samples reflections from objects illuminated by the beam with controlled timing, in response to a receive timing signal, and generates a sample signal in response to the samples;

a timing circuit which supplies the transmit timing signal to the transmitter and supplies the receive timing signal to the receiver, the receive timing signal causing the receiver to sample the reflections such that time between transmission of pulses in the sequence by the transmitter and sampling by the receiver sweeps over a range of delays; and a signal processor, coupled with the receiver, which generates an output indicating a round trip time-of-flight of leading edges of the reflections within said interval.

29. The sensor of claim 28, including a constant current bias circuit coupled to the avalanche photodiode.

30. The sensor of claim 28, wherein the receiver includes a sampling gate coupled to the avalanche photodiode, and an amplifier having an input coupled to the sampling gate.

31. The sensor of claim 28, comprising optics to provide that the transmitted beam and received reflections comprise substantially parallel beams.

32. A method for measuring distance from a first location to a second location, comprising:

transmitting from the first location to the second location a visible light beam of pulses with controlled timing;

sampling at the first location reflections of the visible light beam using an avalanche photodiode or a PIN photodiode such that the time between transmission of pulses in the beam in the transmitting step and sampling periodically sweeps over a range of delays; and processing the resulting samples to determine a round trip time-off-flight of pulses in the beam.

33. The method of claim 32, including producing said pulses using a laser diode.

34. The method of claim 32, including producing said pulses using a light emitting diode.

35. The method of claim 32, including biasing the avalanche photodiode with constant current.

36. The method of claim 32 wherein the transmitting step includes generating the pulses so that at least leading edges of the pulses are highly multimode.

37. The method of claim 32 further comprising processing the resulting samples to produce an equivalent time representation of the received reflections.

* * * * *